(12) United States Patent (10) Patent No.: US 8,456,274 B2
Modiano (45) Date of Patent: Jun. 4, 2013

(54) SYSTEMS AND METHODS FOR AUTOMATED WIRELESS AUTHORIZATION FOR ENTRY INTO A GEOGRAPHIC AREA

(75) Inventor: Andrea Modiano, Brussels (BE)

(73) Assignee: Andrea Modiano, Brussels (BE)

( * ) Notice: Subject to any disclaimer, the term of this patent is extended or adjusted under 35 U.S.C. 154(b) by 1039 days.

(21) Appl. No.: 11/902,528

(22) Filed: Sep. 24, 2007

(65) Prior Publication Data

US 2008/0084272 A1   Apr. 10, 2008

(30) Foreign Application Priority Data

Oct. 5, 2006   (EP) .................. PCT/EP2006/067087

(51) Int. Cl.
*G05B 19/00* (2006.01)
(52) U.S. Cl.
USPC ............................................................ 340/5.2
(58) Field of Classification Search
USPC .......... 340/5.2, 928, 3.1; 235/375; 455/552.1; 703/13; 194/901
See application file for complete search history.

(56) References Cited

U.S. PATENT DOCUMENTS

| 5,086,389 | A | * | 2/1992 | Hassett et al. ................... 705/13 |
| 5,857,152 | A | * | 1/1999 | Everett ........................... 455/406 |
| 5,926,469 | A | * | 7/1999 | Norstedt et al. ............... 370/329 |
| 6,167,271 | A | * | 12/2000 | Parker et al. ................... 455/445 |
| 7,233,260 | B2 | * | 6/2007 | Tang et al. ..................... 340/928 |
| 2006/0071816 | A1 | | 4/2006 | Tang et al. |

FOREIGN PATENT DOCUMENTS

| EP | 1 580 707 A1 | 9/2005 |
| GB | 2 343 088 A | 4/2000 |
| JP | 10-11623 | 1/1998 |
| WO | WO 91/18354 | 11/1991 |
| WO | WO 95/21424 | 8/1995 |
| WO | WO 2005/091229 A | 9/2005 |
| WO | WO 2006/031898 A | 3/2006 |

* cited by examiner

*Primary Examiner* — Vernal Brown
(74) *Attorney, Agent, or Firm* — Modiano & Associati; Daniel O'Byrne

(57) ABSTRACT

A method for automatic electronic authorization for entry into a geographic area based on detection of a mobile station operable on a Global System for Mobile communications network, comprises: transmitting, by a transmitter associated with a toll base station, a signal indicating the presence of the toll base station; detecting, by a receiver associated with the toll base station, a request by a mobile station to connect to the toll base station; transmitting, by the transmitter, an identity request signal to the mobile station; detecting an identity response signal that identifies the mobile station; determining the identity of a subscriber associated with the mobile station based on the detected identity response signal and authorizing the subscriber to enter the geographic area based on the determined subscriber identity.

25 Claims, 3 Drawing Sheets

SYSTEMS AND METHODS FOR AUTOMATED WIRELESS AUTHORIZATION FOR ENTRY INTO A GEOGRAPHIC AREA

The present invention relates generally to authorization for entry into a geographic area, such as automated toll collection for vehicular passage along a road. More specifically, the present invention relates to automated wireless toll collection systems and methods operable with signals associated with existing Global System for Mobile communications (GSM) or other networks where a subscriber is invoiced based on a mobile station associated with the subscriber.

BACKGROUND OF THE INVENTION

Many worldwide road systems require the payment of tolls for passing vehicular traffic. Conventionally, these tolls were paid in cash, and a driver of a vehicle would have to stop, often repeatedly, at toll booths in order to pay the toll. This necessarily results in traffic delays as vehicles are forced to stop and form queues in order to pay. These traffic delays result in increased travel time and passenger frustration. Furthermore, the stop-and-go nature of the traffic jams adds wear and tear to vehicle components such as brakes, and requires increased amounts of gas, which increases both pollution levels and the travel costs associated with the journey. The same problem exists for vehicles that have to pay to enter any designated area for which a fee is required, and extends to situations that do not require a vehicle, such as a person who must wait in a queue to gain entrance to a theater for which a fee is charged, or to an area where a security check is necessary and entry is restricted to authorized people.

In recent years, automated toll systems and other systems authorizing entry into a particular region have been developed in an attempt to alleviate some of these problems. These automated toll systems generally implement Radio Frequency Identification (RFID) technology and require a vehicle or person to be equipped with a unique physical device such as a transponder designed to receive a specific signal and transmit a specific reply. These transponders are separate physical devices used only for a single purpose such as automatic toll collection, and a user of these devices must purchase the transponder. They are also normally semi-passive devices that require a power source such as a battery that must be periodically replaced. Furthermore, if a person uses more than one vehicle, either a different transponder is required for each vehicle, or the transponder must be moved between vehicles. Additionally a transponder will only work on systems with which it is compatible, and may therefore become useless if a driver crosses state, provincial, or national boundaries, or otherwise uses a road covered by a different RFID network, for example.

Conventional automatic toll collection systems and methods such as these typically do not require that the vehicle come to a complete stop. However, they still require that the vehicles slow down significantly, for example from a standard highway speed of 65 mph down to 15 mph. Furthermore, due to limitations of this technology, the vehicles still must form a queue and pass through single lane toll booths to pass within a few meters of a device such as a RFID reader in order for this device to properly receive a signal from the transponder in a vehicle. These forced lane changes and required decelerations increase the possibility of vehicular accidents that can result in property damage or serious bodily injury. As a result, traffic flow and associated inefficiencies and dangers remain severely and negatively affected by these automated toll collection procedures. Other existing systems and methods also require that the person or vehicle reduce speed, alter the direction of travel, or form a queue.

SUMMARY OF THE INVENTION

From the foregoing, it is apparent there is a direct need for systems and methods for automated toll collection where the vehicles do not have to alter the naturally occurring traffic flow or be otherwise distracted in order to pay a toll while driving along a road. This same direct need exists to allow vehicles or persons to pay a fee for entrance into any geographic area without impeding the vehicles or persons entrance into that area. To increase efficiency and reduce the possibility of accidents associated with abrupt lane changes, it is not necessary for vehicles or people to reduce their speed, form a queue, or travel in a specific lane. To further increase efficiency and convenience, it is desirable avoid requiring purchase and use of a dedicated automatic toll payment device by using a multi-functional device that is already in the drivers or persons possession. This improves travel time, associated costs, and vehicle passenger safety.

Thus, the aim of the present invention is to overcome the above mentioned problems and others by providing methods related to automatic electronic authorization for entry into a geographical area based on detection of a mobile station operable on a Global System for Mobile communications network, comprising: transmitting, by a transmitter associated with a toll base station, a signal indicating the presence of the toll base station; detecting, by a receiver associated with the toll base station, a request by a mobile station to connect to the toll base station; transmitting, by the transmitter, an identity request signal to the mobile station; detecting an identity response signal that identifies the mobile station; determining the identity of a subscriber associated with the mobile station based on the detected identity response signal; and authorizing the subscriber to enter the geographical area based on the determined subscriber identity.

The above mentioned aim and others are also achieved by a system for automatic electronic authorization for entry into a geographical area based on detection of a mobile station operable on a Global System for Mobile communications network, comprising: a transmitter associated with a toll base station, the transmitter transmitting a signal indicating the presence of the toll base station; a receiver associated with the toll base station, the receiver detecting a request by a mobile station to connect to the toll base station; the transmitter transmitting an identity request signal to the mobile station; the receiver detecting an identity response signal that identifies the mobile station; a processor determining the identity of a subscriber associated with the mobile station based on the detected identity response signal; and the processor authorizing the subscriber to enter the geographical area based on the determined subscriber identity.

In certain embodiments, the invention may also include extracting billing parameters associated with the subscriber; and processing the identity response signal to invoice the subscriber a monetary amount of a toll due for passage along a road, based on the identity response signal associated with the mobile subscriber. It is also possible to connect the mobile station to the toll base station, and subsequently releasing the connection between the mobile station and the toll base station, where the mobile station then connects to a base station that is part of a Global System for Mobile communications network. The identity request signal detected by the toll base station may also include an International Mobile Equipment Identity signal that uniquely identifies the mobile station. Furthermore, the identity of the subscriber may be determined as the processor compares the extracted characteristics of the subscriber with a database containing data associated with a plurality of subscribers of an automatic toll payment service; and verifies that a detected identity response signal is associated with one of the plurality of subscribers.

The word "toll" as used throughout the entirety of this document including the figures and claims broadly refers not only to a conventional monetary charge for vehicular passage along a roadway, but also to a fee charged for vehicular entrance into a parking lot or other geographic area, as well as to a fee charged to a person for receiving a service, or for passage of that person into any geographic area.

The aim and objects of this invention are achieved by the methods and systems according to independent claim 1 and any other independent claims of this invention. Further details may be found in the remaining dependent claims.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DESCRIPTION OF THE PREFERRED EMBODIMENTS

Figure 1:
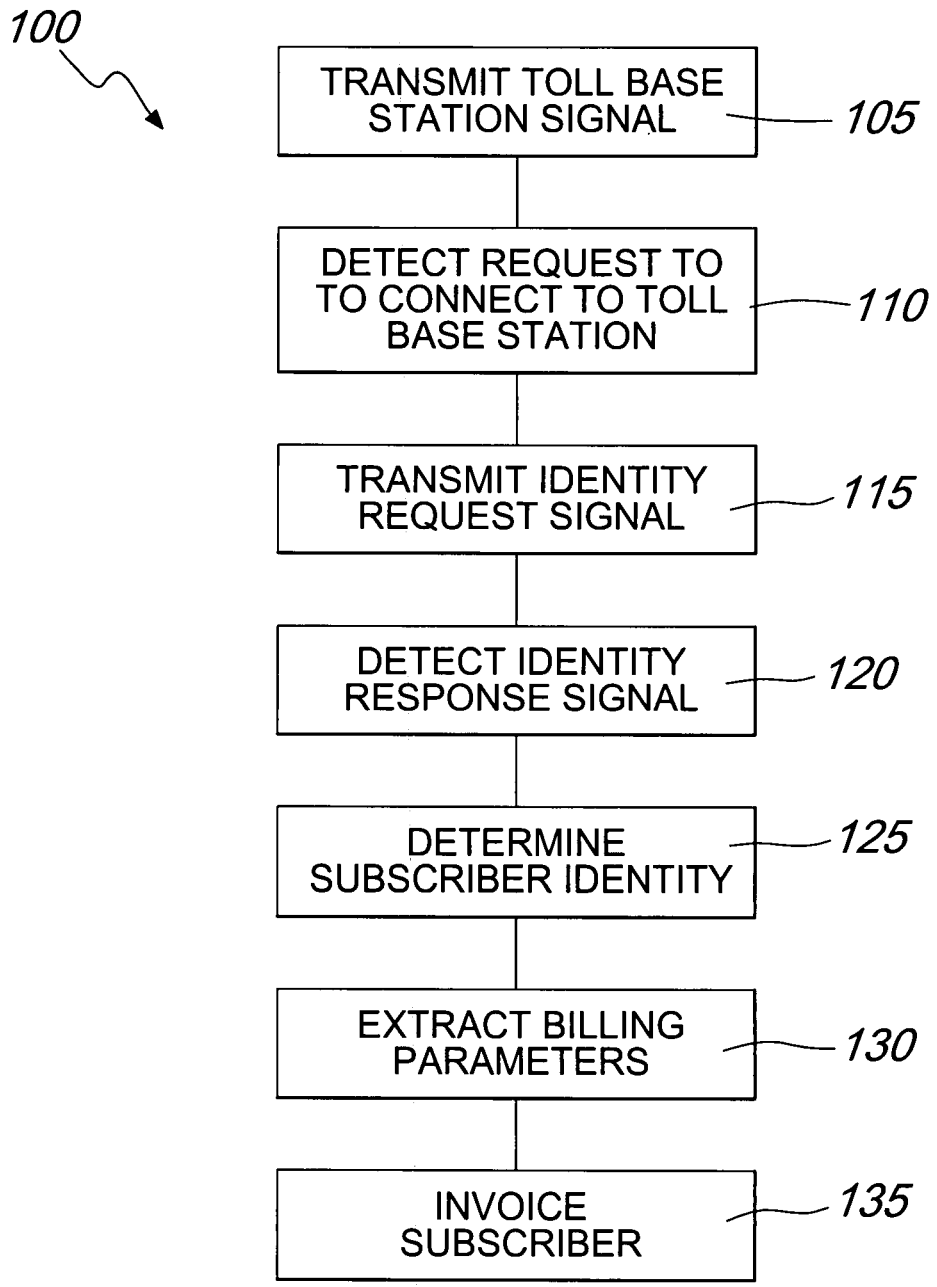
FIG. 1 is a flow chart depicting a method for automatic electronic authorization for entry into a geographic area based on detection of a mobile station in accordance with an embodiment of the invention.

As shown in the drawings for the purposes of the illustration, the invention may be embodied in systems and methods for automatic electronic toll payment based on detection of a mobile station. These systems and methods allow vehicles or persons to maintain their present speed and travel lane. Embodiments of the invention are compatible with existing mobile stations that a vehicle occupant has on his or her person and do not require a separate, dedicated device.

In brief overview, FIG. 1 is a flow chart depicting a method 100 for automatic electronic authorization for entry into a geographic area based on detection of a mobile station in accordance with an embodiment of the invention. Method 100 begins with the step of transmitting a toll base station signal (STEP 105). Transmitting the toll base station signal (STEP 105) may occur with the use of an antenna, such as for example a sector antenna, in order to precisely control the geographic area over which the signal is transmitted. However, other types of antennas, such as omni-directional antenna may be used. Transmitting the toll base station signal (STEP 105), may include transmitting the signal as a Radio Frequency (RF) signal.

After transmitting the toll base station signal (STEP 105), method 100 proceeds to the step of detecting a request by a mobile station to connect to the toll base station (STEP 110). Detecting step (STEP 100) may be accomplished by use of a receiver associated with the toll base station, and the detected signal may include a radio frequency or other type of wireless signal or transmission. The signal may be detected in any manner or location provided this detection (STEP 110) is communicated to logic associated with the toll base station. Typically the request to connect to the toll base station originates from a mobile station. Upon detection of a request from a device such as a mobile station to connect to the toll base station (STEP 110), method 100 proceeds to transmit an identity request signal (STEP 115). Generally, the purpose of this transmission (STEP 115) is to request information that uniquely identifies the originating source of the request to connect to the toll base station that was received during the receiving step (STEP 110). Transmission of the identity request may be accomplished by any transmission means, including the transmission means used for transmitting the toll base station signal (STEP 105).

Once transmitting an identity request signal (STEP 115), method 100 waits for the detection of an identity response signal (STEP 120). Generally this identity response signal is a signal that uniquely identifies the device that has requested to connect to the toll base station. In various embodiments, STEP 120 may include detecting an International Mobile Equipment Identifier (IMEI) associated with the device, where the device may be a mobile station such as a mobile telephone.

At this point of method 100, a base station, which transmits its signal over a specific geographic area (STEP 105), has received a request by a device to connect to the toll base station (STEP 110), and has transmitted a request for an identity signal (STEP 115) and received (STEP 120) a response to this request that identifies the device. Method 100 typically proceeds with the step of authenticating a subscriber identity (STEP 125), where the subscriber identity typically includes information related to the person carrying the device. Typically, this step entails verifying an association between the device and a person, such as the owner of the device. In other words, the device, which may be a mobile station such as a mobile telephone is associated with a person, such as the owner of the mobile phone.

In some embodiments, the identity of the subscriber will be checked against a database of participants in these automated toll collection systems and methods. In such a case, if the subscribers identity appears on the database, then the automated tolling procedure will proceed or the subscriber will be otherwise authorized for entry into a geographic area. If the subscriber identity information does not appear on a database, the subscriber is not partaking in these systems and methods and must pay any tolls in a conventional fashion. This illustrative embodiment prevents unauthorized toll invoicing without the consent of the owner of a mobile station, and can be useful in situations where, for example, a family of four each has a mobile telephone and is travelling in the same car, and only one person, such as the driver, wishes to be billed. In such a case, only one person out of the family, such as the driver, would have his or her subscriber identity included in a database that is checked as part of STEP 125 to authenticate subscriber identity.

Once a subscriber associated with the device has been identified (STEP 125), if a toll is due method 100 generally proceeds to extract billing parameters associated with the subscriber (STEP 130). These billing parameters may include any information necessary for the subscriber to be invoiced, charged, or debited the cost of any toll that may be due. Extracting billing parameters (STEP 130) may be accomplished by any means and may involve a processor processing data associated with the subscriber. This processor may be either integral to or remote from the toll base station. Billing parameters may be extracted by retrieving this information from an electronic database where billing parameters are associated with the identified subscriber.

Method 100 may then proceed with the step of invoicing the subscriber (STEP 135). Generally invoicing the subscriber includes charging the subscriber a monetary amount due for a toll incurred for passage along a particular portion of a road. The subscriber may be invoiced (STEP 135) in a variety of ways. For example, the subscriber invoicing (STEP 135) may include a form of automatic account debiting, or sending an invoice electronically or via standard mail. Subscriber invoicing (STEP 135) may also be linked to a credit card associated with the subscriber.

Figure 2:
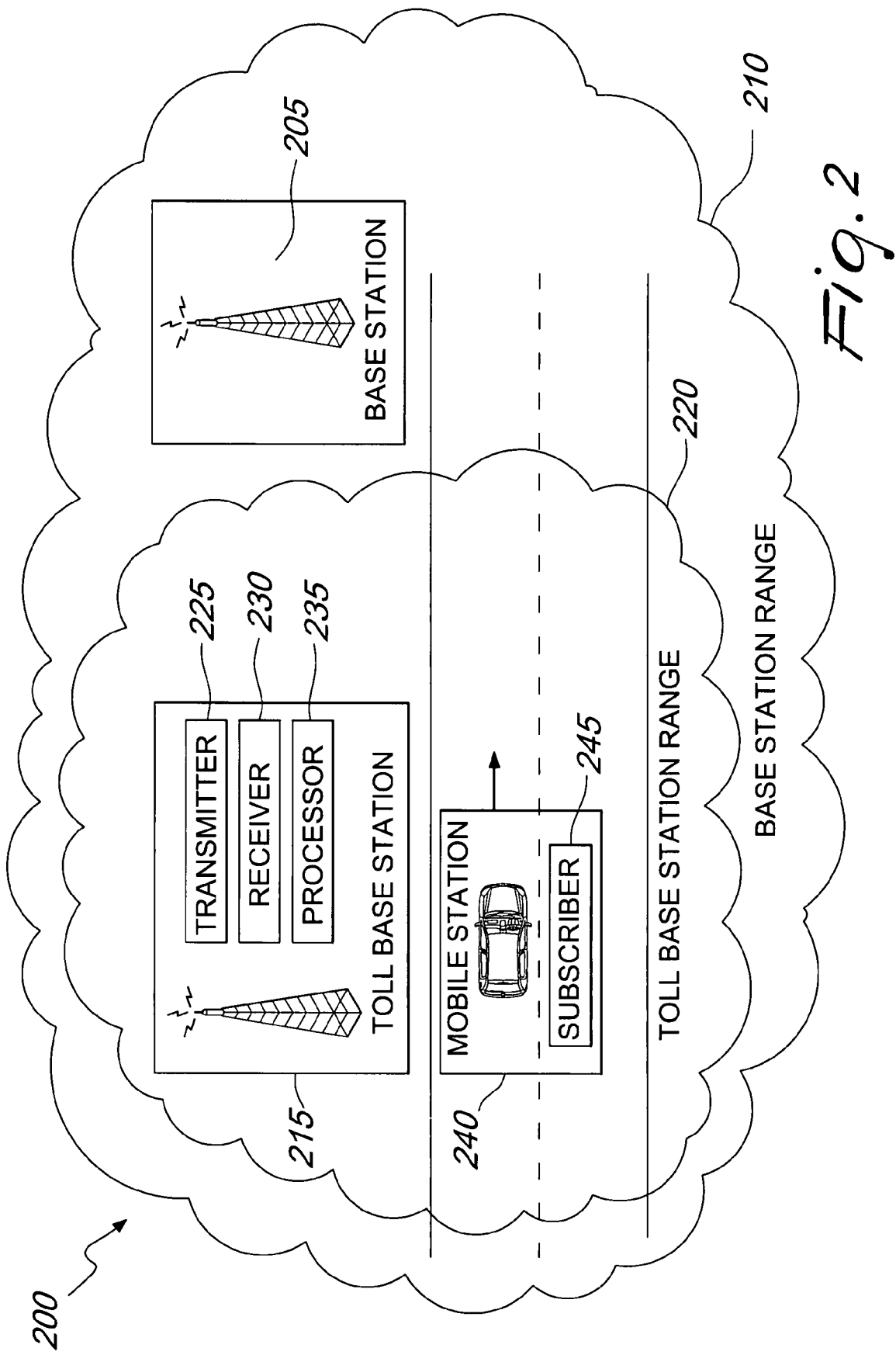
FIG. 2 is a block diagram depicting a system for automatic electronic authorization for entry into a geographic area based on detection of a mobile station in accordance with an embodiment of the invention.

In brief overview, FIG. 2 is a block diagram depicting a system 200 for automatic electronic authorization for entry into a geographic area based on detection of a mobile station in accordance with an embodiment of the invention. Base station 205, which may also include a base station transceiver and a base station controller, is generally a component of a mobile telephone network such as a Global System for Mobile communications (GSM) network. Other networks may also be used, such as a Universal Mobile Telecommunication System (UMTS) network, or any third generation (3G) or similar network. Base station 205 typically provides the radio interface to a mobile station, such as a mobile or cellular telephone, so that the mobile telephone is connected to the network (i.e., "in range") and is capable of sending and receiving calls. Given the extensive coverage of GSM and other mobile telephone networks, system 200 will often fall within a geographic location covered by one or more base station 205, but it is not necessary that system 200 be located within the range of base station 205. Base station 205 is typically part of a mobile telephone network and is necessary for a mobile telephone to have the reception necessary to place or receive a phone call.

The entirety of system 200 may be encompassed within the range 210 of one or more base stations 205. Base station range 210 is generally the geographic area over which base station 205 transmits a signal strong enough for use in mobile telephone communications. There is generally one base station range 210 corresponding to each base station 205.

System 200 also generally includes at least one toll base station 215. Toll base station 215 generally has the same functional characteristics as base station 205 and may be referred to herein as a type of base station. However, toll base station 215, unlike base station 205, does not form part of a GSM (or any other) mobile telephone network. Toll base station 215 mimics the signals of GSM or other base stations such as base station 205 but is dedicated to retrieving information for automated toll collection, and not for mobile telephone communications. Therefore toll base station 215 generally does not connect outgoing, or uplink, calls. By rejecting uplink call requests, any mobile telephone making such requests is typically forced to select a network associated with base station 205.

Toll base station 215 generally behaves like base station 205 towards a mobile telephone, and in relation to base station 205, toll base station 215 behaves like a mobile telephone. Toll base station 215 generally sends signals over a geographic toll base station range 220. Toll base station range 220 may be partially or completely within the geographic area of base station range 210. In such a case toll base station range 220 may include the geographic area where the signals transmitted from toll base station 215 are stronger than the signals transmitted from base station 205. Alternatively toll base station range 220 may not overlap at all with base station range 210. In some embodiments toll base station range 220 may cover a particular stretch of a road subject to vehicular traffic.

Toll base station range 220 and system 200 in general, is not limited to levying a toll for travel along a particular stretch of road. Toll base station range 220 may also cover a parking lot (i.e., car park) where vehicles normally pay to park, or any geographic area where payment is required or where entry is restricted to authorized people or vehicles. This includes situations where a toll (i.e., monetary fee) is levied against vehicles or persons for entry into any restricted area. In situations where toll base station range 220 is designed to cover a parking lot, toll base station 215 may be situated near the entrance or exit points of the parking lot. Generally, toll base station range 220 may cover any geographic area, including buildings such as theaters, arenas, or office space, parking lots, and stretches of road.

Toll base station range 220 may cover a portion of a road where a toll is levied against all vehicular traffic. It is not necessary for toll base station range to cover the entire length of the road. Instead, toll base station range acts generally as a "virtual toll booth" and covers only the width of the road (e.g., all three lanes plus the breakdown lane of a three lane highway) for a sufficient length of road to identify a car and assess the appropriate toll.

In an embodiment, toll base station 215 signal may be the strongest for approximately 7 seconds. When a vehicle drives at a speed of 120 km/h toll base station range 220 size should at least be 234 meters. At a speed of 180 km/h the length of the range would be approximately 350 meters).

Toll base station 215 also may include one or more transmitters 225, receivers 230, and processors 235. Transmitter 220 generally includes an electronic device that generates and amplifies a carrier wave, modulates it with a signal, such as a signal derived from speech or other sources, and radiates the resulting signal from an antenna. Transmitter 225 may be integral to or otherwise associated with toll base station 215.

Receiver 230 generally includes a device capable of detecting and capturing incoming radio frequency signals. Like transmitter 225, receiver 230 may also be integral to or otherwise associated with toll base station 215.

Processor 235 typically includes a central processing unit or other part of a computer that includes data processing logic for processing data, such as by converting the data from one format to another format. Processor 235 may be a component of toll base station 215, however it is also possible for processor 235 to be located remotely from toll base station 215. Processor 235 may be associated either directly or indirectly with toll base station 215.

System 200 also typically includes at least one mobile station 240. Mobile station 240 generally includes a physical device such as a radio transceiver, display monitor, digital signal processors. As its name implies, mobile station 240 is generally mobile, and therefore may travel through all or part of toll base station range 220. In an embodiment of the present invention, mobile station 240 is a mobile telephone, (also called a cellular telephone).

Mobile station 240 may also include a Subscriber Identity Module (SIM), also known as a "smart card" or "SIM card". Typically, mobile station 240 must have a SIM, if there is no SIM available mobile station 240 can only make emergency calls and location updating will not be performed. This location updating is generally necessary for mobile station 240 to switch its connection from one base station 205 to another base station 205 (or to toll base station 215) as mobile station 240 changes location. A mobile station 240 without a SIM has no reason to let the GSM network know where it is located because nobody can reach it. Therefore in an embodiment of the invention a SIM may be necessary to activate the GSM network and provide location awareness and updating. However, this embodiment does not require any functionality of the SIM or of its operator.

The hardware that comprises mobile station 240, (i.e., the actual mobile telephone itself, and not the smart card) includes a unique identifier typically referred to as the International Mobile Equipment Identity (IMEI). The SIM also includes a unique identifier known as the International Mobile Subscriber Identity (IMSI). The IMEI and the IMSI are independent of each other. The IMEI identifies the mobile telephone, and the IMSI identifies the smart card.

Generally, mobile station 240 is registered to a GSM or other network associated with a plurality of base stations 205. Toll base station 215 generally retrieves the International Mobile Equipment Identity number of every mobile subscriber 240 that enters base station range 210 with no significant interference of GSM network function.

Mobile stations 240 generally select a Public Land Mobile Network (PLMN) that is part of the overall GSM network. Public Land Mobile Networks (PLMN) that are used by base stations 205 are identified by a Mobile Country Code (MCC) as well as a Mobile Network Code (MNC). These codes comprise part of the Location Area Information (LAI) transmitted by base stations 205. Mobile station 240 listens only to the base stations 205 that are part of the selected PLMN, and therefore toll base station 215 must transmit the same MCC and MNC signals that are transmitted by base stations 205 in order for mobile stations 240 to properly respond.

Mobile station 240 is generally associated with a subscriber 245. Subscriber 245 may be a person who participates in the automatic wireless systems and methods defined by the present invention. Subscriber 245 may be travelling in a vehicle, or may be on foot. In an embodiment, subscriber 245 affirmatively consents to these forms of automatic electronic authorization, and subscriber 245 generally has mobile station 240 on or about his or her person when travelling through toll base station range 220.

Mobile station 240 will typically connect, or "camp" onto a base station associated with the strongest signal received by mobile station. The signal strength of this camping is often visually indicated by mobile station 240. For example the monitor of a mobile telephone (mobile station 240) will indicate the strength of the signal the mobile telephone is receiving in its present location. When mobile station 240, that is currently camped to a base station 205, moves to another geographic location, it generally eventually encounters another base station range associated with another base station 205. If the signal strength of this other base station 205 becomes stronger than the signal strength of the base station to which mobile station 240 is currently camped, mobile station 240 will switch its camping from the previous base station 205 to the new base station 205. At this point mobile station 240 is now camped to the new base station 205. In this way, mobile station 240 is generally camped, or connected to, the base station 205 with the strongest signal in a particular geographic area. Therefore in toll base station range 220, where the signal from toll base station 215 is stronger than the signal from base station 205, mobile station 240 will camp to toll base station 215, and not to base station 205.

Similarly if mobile station 240 is not located within base station range 210 (and therefore is "out of range" and has no cell phone service), and mobile station 240 then enters toll base station range 220, mobile station 240 will camp to toll base station 215.

Figure 3:
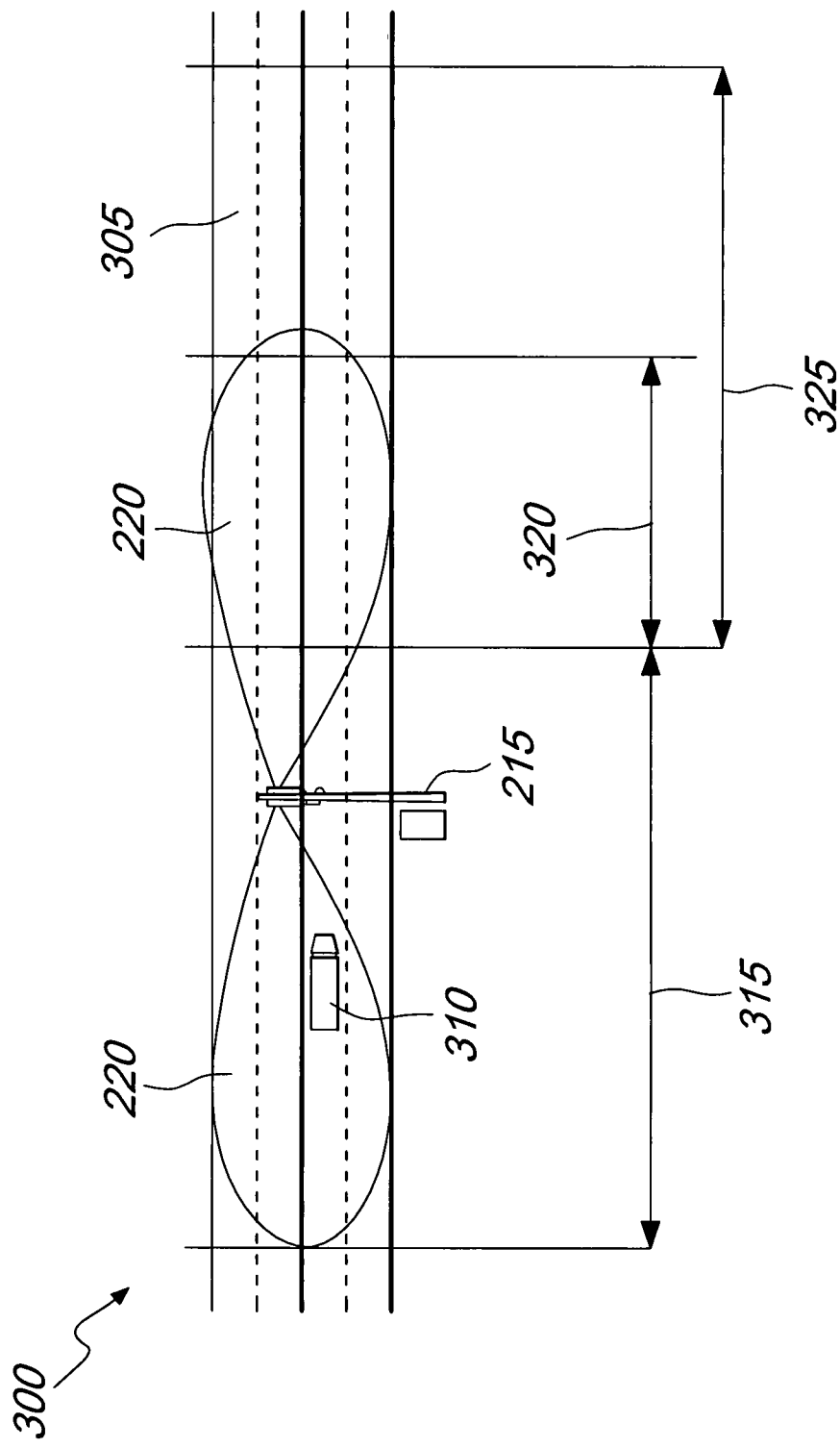
FIG. 3 is a diagram indicating the toll base station range in accordance with an embodiment of the invention.

An example depicting the size of toll base station range is indicated in FIG. 3. The size of toll base station range 220 is generally determined by the time it takes for toll base station 215 to obtain necessary identification of mobile station 240, such as the duration of the International Mobile Equipment Identifier (IMEI) retrieval procedure and the time needed to let the mobile station connect to toll base station 215. FIG. 3 generally depicts a system 300 that includes a road 305. In this example, truck 310 includes a subscriber 245 (the driver) and mobile station 240, such as a mobile telephone. Truck 310 is in motion and is passing through toll base station range 220 emitted from toll base station 215. In this illustrative embodiment, the length of road 315 represents the time needed to let the mobile station 240 connect to toll base station 215. This time may be, for example, a minimum of 5 seconds. Length of road 320 represents the time needed for the retrieval of identifying information, such as the IMEI, from mobile station 240. This typically requires about 1.5 to 2.0 seconds. Length of road 325 represents the time passed before mobile station 240 does a re-selection to re-camp to base station 205. In some embodiments, this may take about 5.3 seconds.

Returning to FIG. 2, in a general embodiment of system 200, transmitter 225 is transmitting a signal indicating the presence of toll base station 215. This signal is generally in the frequency domain corresponding to an assigned Broadcast Control Channel Allocation List (BCCH List, or BA List). This BA list corresponds to the domain of frequencies base stations are allowed to transmit to provide bandwidth for mobile stations. Transmitter 225 of toll base station generally 215 transmits frequencies in the same frequency range as those transmitted by base stations 205. The geographic area covered by the signal transmitted by transmitter 225 forms toll base station range 220, which generally is either the area where mobile station can receive the signal, or the area where the signal from transmitter 225 is stronger than the signal from any base station range 210. In either event, mobile station 240 will typically camp to toll base station 215 when mobile station 240 enters toll base station range 220.

As mobile station 240 enters toll base station range 220, it will generally transmit a request to camp, i.e., to connect, to toll base station 215. It follows that receiver 230 will generally detect a request by mobile station 240 to camp to the toll base station 215. Toll base station 215 may then allow mobile station 240 to camp to it.

Following receipt of the request by mobile station 240 to connect to toll base station 215, transmitter 225 may transmit an identity request signal to mobile station 240. This identity request may include a request for the International Mobile Equipment Identity (IMEI) of mobile station 240. Mobile station 240, upon receipt of this request, sends an identification signal in response. Receiver 230 typically detects this identity response signal that uniquely identifies mobile station 240. This may include detecting the International Mobile Equipment Identity associated with mobile station 240.

Generally, the identification signal such as the IMEI may be accessed by toll base station 215 without interfering with other mobile services. Typically, the identity request signal (sometimes called an identity request message) is composed of a concatenation of several fields. One field of the identity request signal is a Type of Identity field, and an identification request signal to request the IMEI of mobile station 240 may be obtained by setting the type of identity field to a 010 binary signal. In such a case, mobile station 240, upon receiving this identity request signal, will respond by transmitting an identity response signal that includes the IMEI of mobile station 240.

At this point processor 235 now has all required information to uniquely identify mobile station 240 that is located within toll base station range 220. In many situations a plurality of mobile stations 240 may be identified as all being located within toll base station range 220 simultaneously. Processor 235 also may authenticate the identity of a subscriber 245 associated with mobile station 240. Subscriber 245 is generally a person who has consented (expressly or implicitly) to the forms of automated toll collection disclosed in the present invention. Subscriber 245 may consent, for example, by associating his name with mobile station 240 identity such as the IMEI or IMSI, and allowing this information to be stored on a database used for toll collection purposes. Processor 235 may then check mobile station 240 identifier against this database to determine if subscriber 245 is eligible for this form of automated toll payment.

If subscriber 245 is eligible for this form of toll payment, processor 235 may then extract billing parameters associated with subscriber 245. These billing parameters may include any of a subscriber name, a subscriber address, a subscriber account number, or the amount of the presently incurred toll the subscriber must pay. Billing parameters may also include any of account balance information, bank account information, forms of billing, or balances due. Processor 235 typically proceeds to invoice subscriber 245 the amount of any toll that may be due. This may include creating and sending a bill to subscriber 245, or any form of preauthorized automatic withdrawal or credit card payment.

Generally, the systems and methods of the present invention are compatible with existing mobile stations 240 that include mobile telephones for use with Global System for Mobile communications (GSM) or other networks. The systems and methods for automated electronic toll collection disclosed herein generally include several toll access points that are covered by toll base station range 220 along roads such as highways. When a vehicle enters the vicinity of such an access point, the driver is identified based on his or her mobile station 240 without the need to reduce driving speed. In some embodiments, a central database may track the locations where the driver's mobile station 240 has been identified and this triggers an automatic billing system. Generally, the identification is only dependent on the mobile station hardware and not on existing mobile services (offered by mobile operators). Therefore the systems and methods of the invention generally to not require use of the Subscriber Identity Module (smart card, or SIM card) or its associated International Mobile Subscriber Identifier (IMSI) information. In an embodiment, the systems and methods of the invention may identify subscriber 245 based solely on the IMEI (International Mobile Equipment Identifier) information associated with the mobile telephone itself (mobile station 240).

The systems and methods of the present invention generally access the IMEI number of a mobile telephone associated with mobile station 240 without interfering with standard mobile services provided by GSM or other networks. This may be accomplished by temporarily allowing mobile station 240 to connect (i.e., camp) to toll base station long enough to identify subscriber 245. If, prior to entering toll base station range 220, mobile station 240 was camped to base station 205, then mobile station 240 will disconnect from base station 205 and connect to toll base station 215 as soon as toll base station 215 signal strength surpasses base station 205 signal strength. Generally, after receiver 230 receives data identifying mobile station 240, (such as an IMEI signal) this connection is released, and mobile station 240 may then re-connect to a signal from base station 205, if mobile station 240 is within base station range 210. In this way mobile station 240 generally only connects to the strongest "cell" which may be either base station 205 or toll base station 215.

Mobile station 240 typically has a variety of operational states. For example, mobile station 240 may be idle (i.e., on standby), in the process of setting up a call, in the process of receiving a call, or in conversation mode during a call. When mobile station 240 is already camped on base station 205, generally a re-selection algorithm is carried out which may enable mobile station 240 to disconnect from base station 205 and connect to toll base station 215. Generally, this requires that toll base station 215 operate at a frequency on the Broadcast Control Channel (BCCH) allocation list of base station 205. Toll base station 215 typically must also include the same Mobile Country Code and Mobile Network Code as base station 205. Furthermore, toll base station must have a path lost criterion ("C1") that is greater than zero, as indicated in the following computer code excerpt:

---

The path loss criterion parameter C1 used for cell selection and reselection is defined by:
C1 = (A − Max(B, O))
where A = Received Level Average − RXLEV_ACCESS_MIN
  B = MS_TXPWR_MAX_CCH − P
RXLEV ACCESS_MIN = Minimum received level at the MS required for access to the system
MS_TXPWR_MAX_CCH = Maximum TXPWR level an MS may use when accessing the system until otherwise commanded
P = maximum RF output power of the MS.
All values are expressed in dBm.

---

The parameters, RXLEV_ACCESS_MIN and MS_TXPWR_MAX_CCH, are broadcast on the BCCH of the serving cell. If toll base station 215 is down for maintenance or not functioning properly, it may have the status of "barred". To unbar toll base station 215 a Cell Bar Access parameter should be sent.

Toll base station 215 may possess a different Location Area Code than that of a base station, such as for example a base station 205 that mobile station 240 may be camped on as it entered toll base station range 220. This generally enables toll base station 215 to be aware of the fact a new mobile station, such as mobile station 240, is camped on it.

Mobile station 240 generally connects to toll base station 215 if the calculated value of C1 for toll base station 215 exceeds the C1 value of the current serving base station, such as base station 205 by a least CELL_RESELECT_HYSTERESIS dB for a period of time, such as for example 5 seconds. This last parameter is provided through the BCCH data from the serving base station. Before camping to toll base station 215, mobile station 240 may attempt to decode the full set of data (system information) of the BCCH to check the MCC/MNC and the CELL_BAR_ACCESS.

Generally, after a connection has been set up between mobile station 240 and the toll base station 215, system information messages are transmitted between these devices on SACCH (Slow Access Control Channel). System information generally contains information on the BCCH allocation in neighboring base stations, as well as information such as location area identification and base station identity.

In a general embodiment, mobile station 240 generally connects to whatever base station (one of base stations 205 or mobile stations 240) from which it is receiving the strongest signal. If toll base station 215 location area code (LAC) is different from the LAC of base station 205 that mobile station 240 may be currently camped on, the mobile station 240 may then set up a connection to toll base station 215 and send a location update request, to which toll base station 215 may respond by sending an identity request signal, such as a request for IMEI data, to mobile station 240.

In a illustrative embodiment, within a predefined base station the C1 of toll base station 215 must be CELL_RESELECT_HYSTERIS higher than the C1 of the base station to which mobile station 240 is currently connected. This typically causes a Location Area Identity (LAI) message to be broadcast. As a minimum condition for selection the toll base station 215, the LAC of toll base station 215 may be different from that of the base station to which mobile station 240 is currently connected. The frequency used by toll base station 215 is typically a member of the BA list (BCCH Allocation list) of the current base station, such as base station 205, and the LAI of toll base station 215 typically contains the MCC and MNC of the network associated with the base station to which mobile station 240 is currently connected. Mobile station 240 may only scan all of the 124 available frequencies if none of the frequencies that are member of the BA list can be received.

Continuing with this illustrative embodiment, mobile station 240 may detect toll base station 215 and attempt to connect to it by setting up a RR (Radio Resource) connection, i.e., by sending a RR Channel Request message in an access burst on the RACH (Random Access Channel) of toll base station 215.

Toll base station 215 may then will assign an SDCCH (Stand-alone Dedicated Control Channel) to the mobile station 240 by sending an RR Immediate Assignment on its AGCH (Access Grant Channel), which generally causes mobile station 240 to send a Location Update Request to toll base station 215 on the assigned SDCCH and to begin sending Measurement Reports on its SACCH. Toll base station 215 may then send an Identity request with Type Of Identity field equal to 2, which acts as a request for mobile station 240 to transmit an identity response with its IMEI data to toll base station 215. Finally, toll base station may send a Location Update Accept and a RR Channel Release.

In an embodiment, after receipt by toll base station 215 of data such as IMEI data indicating mobile station 240 identity, it is no longer necessary for mobile station 240 to remain connected to toll base station 215. Therefore mobile station 240 may disconnect from toll base station 215, where mobile station 240 is free to connect (or re-connect) with base station 205. There are several situations where mobile station 240 may select a base station for connection. For example, if the path loss criterion (C1) for a base station or toll base station 215 connected to mobile station 240 falls below zero for a finite time period, such as for example five seconds. A downlink signaling failure, or BCCH data indicating the connected base station is barred will also cause mobile station 240 to select another base station 205 or toll base station 215 for connection. Furthermore, if the C1 value for a non-connected base station 205 (or toll base station 215) exceeds the C1 value of a connected base station 205 (or toll base station 215) for a period of time such as five seconds then a stronger signal has been detected. If the new base station (or toll base station 215) is in a different location area, then the C1 value may be required to exceed the C1 value of the connected base station (or toll base station 215) by at least CELL_RESELECT_HYSTERESIS dB as defined by BCCH data from the currently connected base stations for a period of time, such as five seconds. In some embodiments, a random access attempt that is unsuccessful after a certain number of tries, such as the number defined on the BCCH as being "*MAX retrans", then re-selection of a base station or toll base station 215 may occur.

In a general embodiment, once the identity response signal such as the IMEI identifying mobile station 240 has been received and cashed, it is desirable for mobile station 240 to disconnect from toll base station 215 and connect or reconnect to base station 205 as soon as possible. This is generally referred to as a re-selection to the genuine network. Generally this is most efficiently accomplished by transmitting a downlink signaling failure message from toll base station 215 to mobile station 240.

Downlink signaling failure criterion is generally based on the Downlink Signaling failure Counter (DSC). When mobile station 240 is camped on toll base station 215 or base station 205, DSC may be initialized to a value equal to the nearest integer to 90/N, where N is the BS_PA_MFRMS parameter for that base station 205 or toll base station 215. Thereafter, successful decoding by a mobile station 240 in a paging subchannel causes the DSC to increase by 1, (however never beyond the nearest integer to 90/N), otherwise DSC is decreased by 4. If the DSC becomes equal to zero, a downlink signaling failure is declared and the re-selection process commences.

In one embodiment, the reselection process takes approximately 5.3 seconds, in accordance with the following equation:

$$\left. \begin{array}{r} \dfrac{90}{N} - 4F = 0 \\ \Delta P \cdot N \cdot F = \Delta C \end{array} \right\} \Rightarrow \Delta C = \dfrac{90}{4} \Delta P \approx 5.3 \text{ s}$$

Where
  N is the BS_PA_MFRMS (sent in system information 3, in the control channel description) parameter for that base station 205 or toll base station 215;
  F is the amount of corrupt Paging messages the mobile station 240 needs to receive;
  N.ΔP is the time between two Paging messages for mobile station 240;
  ΔC is the time needed to generate a downlink signaling failure; and
  ΔP=(51×8)×15/26 ms (duration of a 51-frame multiframe) ≈235 mS.

In the case of a Mobile Originating Call (uplink call) the reselection process may be further sped up. Base station reselection may occur when mobile station 240 has had a "MAX retrans" (a BCCH parameter) number of unsuccessful random access attempts. This generally requires distinguishing between a channel request sent by mobile station 240 to do a location update (often here the field ESTABL_CAUSE in the channel request is equal to zero) and the channel requests used to set up a mobile originating call or an emergency call (generally in these cases the field ESTABL_CAUSE will not be equal to zero).

Another way to hasten the reselection process after toll base station 215 has received identity subscriber data such as the IMEI of mobile station 240 may be to send a Location Updating Rejected message from toll base station 215 to mobile station 240. This causes mobile station 240 to "think" it has not connected to toll base station 215 and thus mobile station 240 immediately looks for another base station such as base station 205 to connect to.

In various other reselection signals may also be used provided that mobile station 240 does not become barred or label toll base station 215 as invalid. Some examples of alternate reselection signals include sending a message that the IMSI is unknown to the Home Location Register (HLR), a message indicating an illegal mobile subscriber or illegal mobile equipment; a message indicating access is prohibited to the Public Land Mobile Network (PLMN) associated with the GSM network. Similar messages may also indicate the roaming is not allowed in that particular area, or that the location area is not allowed, which may cause the LAI to be stored on a forbidden location areas list. The "forbidden location area for roaming" and "forbidden location areas for regional provision of service" lists are generally only erased when mobile station 240 is switched off or when the SIM is removed, or periodically, (such as every 12 to 24 hours). Another possibility may be to use a different reject cause than those described above, such as a "retry upon entry into a new base station (i.e., cell). For example, reject causes may be as indicated below:

| Reject cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | IMSI unknown in HLR |
| 0 | 0 | 0 | 0 | 0 | 0 | 1 | 1 | Illegal MS |
| 0 | 0 | 0 | 0 | 0 | 1 | 0 | 0 | IMSI unknown in VLR |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 1 | 0 | 1 | 1 | PLMN not allowed |
| 0 | 0 | 0 | 0 | 1 | 1 | 0 | 0 | Location Area not allowed |
| 0 | 0 | 0 | 0 | 1 | 1 | 0 | 1 | Roaming not allowed in this location area |
| 0 | 0 | 0 | 1 | 0 | 0 | 0 | 1 | Network failure |
| 0 | 0 | 0 | 1 | 0 | 1 | 1 | 0 | Congestion |
| 0 | 0 | 1 | 0 | 0 | 0 | 0 | 0 | Service option not supported |
| 0 | 0 | 1 | 0 | 0 | 0 | 0 | 1 | Requested service option not subscribed |
| 0 | 0 | 1 | 0 | 0 | 0 | 1 | 0 | Service option temporarily out of order |
| 0 | 0 | 1 | 0 | 0 | 1 | 1 | 0 | Call cannot be identified |
| 0 | 0 | 1 | 1 | 0 | 0 | 0 | 0 | retry upon entry into a new cell |
| | | | to | | | | | |
| 0 | 0 | 1 | 1 | 1 | 1 | 1 | 1 | |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type nonexistent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the mobile station shall be treated as 0010 0010, 'Service option temporarily out of order'. Any other value received by the network shall be treated as 0110 1111, 'Protocol error, unspecified'.

Generally, when mobile station 240 receives a Location Updated Reject message with an abnormal reject cause, it may react by stopping a timer such as Timer T3210 if it is still running. Timer T3210 is typically started when a Location Update Request Message is sent by mobile station 240 and is typically stopped when a Location Update Accept or Location Update Reject message is received in return. The Radio Resource Connection is generally aborted when timer T3210 times out. In this case, the attempt counter is then incremented. The next actions generally depend on the Location Area Identities (stored and received from the BCCH of the current serving cell) and the value of the attempt counter. If the update status is UPDATED, and the stored LAI is equal to the one received on the BCCH from the current serving cell and the attempt counter is smaller than 4, mobile station 240 may keep the update status to UPDATED, the MM (Mobility Management) IDLE sub-state after the Radio Resource (RR) connection release is NORMAL SERVICE (see further). The mobile station may memorize the location updating type used in the location updating procedure, and typically starts timer T3211 when the RR connection is released.

When timer T3211 expires the location updating procedure may be triggered again with the memorized location updating type, generally either the update status is different from UPDATED, or the stored LAI is different from the one received on the BCCH from the current serving cell, or the attempt counter is greater or equal to 4.

Mobile station 240 generally deletes any LAI, TMSI, or ciphering key sequence number stored in the SIM, sets the update status to NOT UPDATED and enters the MM IDLE sub-state ATTEMPTING TO UPDATE when the RR connection is released. If the attempt counter is smaller than 4, mobile station 240 may memorize that timer T3211 is to be started when the RR connection is released, otherwise it may memorize that timer T3212, which may be used to perform periodic updating, may be started when the RR connection is released. A typical timeout value for T3211 is 15 seconds. This same procedure is generally also followed if a RR connection failure occurs, the RR connection is released before the normal end of the procedure, or Timer T3210 times out.

When mobile station 240 is receiving normal service, it generally may perform normal location updating when a new location area is entered; perform location updating procedure at expiry of timer T3211; perform periodic updating at expiration of timer T3212; perform an IMSI detach; support requests from the CM (Connection management) layer; or respond to paging. When mobile station 240 is in sub state ATTEMPTING TO UPDATE mobile station 240 may perform location updating procedure at expiry of timer T3211, perform normal location updating when the location area identification of the serving cell changes, or, if entry into this state was caused by a random access failure (with cause different from "abnormal release, unspecified") or a Location Update Rejected message (with cause "retry upon entry into a new cell"), then location updating may be performed when a new base station 205 or toll base station 215 is entered. If entry into this state was caused by an "abnormal release, unspecified" condition, or a Location Update Rejected message (with an abnormal cause different from "retry upon entry into a new cell"), then location updating may not be performed because a new cell has been entered.

Furthermore, mobile station 240 may perform normal location updating at expiry of timer T3212 (initiate periodic updating); may not perform IMSI detach; may support a request for emergency calls; may use other request from CM layer as triggering of normal location updating procedure (if the location updating procedure is successful, then the request for MM connection is accepted); or may respond to paging, for example with IMSI.

Other possibilities for allowing mobile station 240 to connect or reconnect with base station 205 after sending identification information such as its IMEI to toll base station 215 include making use of the abort procedure. The abort procedure may be invoked by the GSM network associated with base station 205, or with toll base station 215 to abort any on-going or established Mobility Management (MM) connection. Mobile station 240 generally treats an abort message as being compatible with a current protocol state if it is received when at least one MM connection exists or an MM connection is being established.

The abort procedure may be initiated by the GSM network or by toll base station 215 and may include the abort message sent from the GSM network to mobile station 240. Before the sending the abort message the network generally locally releases any ongoing MM connection. After sending the abort message the network may start the normal RR connection release procedure. A cause information element generally indicates the reason for the abortion, such as illegal mobile equipment, or a network failure.

Mobile station 240 may also initiate the abort procedure. Generally, upon receipt of the abort message mobile station 240 aborts any MM connection establishment or call reestablishment procedure, and releases any MM connections. Mobile station 240 may also delete any TMSI, LAI and ciphering key sequence numbers stored in the SIM, set the update status to ROAMING NOT ALLOWED, store this status in the SIM, and consider the SIM invalid until turn-off or until the SIM is removed. As a consequence mobile station 240 enters the state MM IDLE, and the substate NO IMSI after the release of the RR connection. Mobile station 240 may then wait for the network to release the RR connection. Typically, a Cause Information Element indicating network failure would not release all ongoing MM connections at toll base station 215.

If mobile station 240 is camped to toll base station 215, it may not be able to receive downlink calls. Therefore, once toll base station 215 has obtained identifying information such as the IMEI of mobile station 240, mobile station 240 should reconnect to the GSM network as fast as possible in order to listen to the right paging channel. In a typical embodiment based on downlink signalling failure, mobile station 240 may be unreachable to the GSM network for 5.3 sec. If mobile station 240 remains within toll base station range 220 it may camp again to toll base station 215 after 15 seconds, and it may remain camped to toll base station 215 for another 5.3 sec before camping again to the GSM network. In this illustrative embodiment, this cycle may repeat as long as mobile station 240 remains within toll base station range 220, and may be unreachable to a caller about 26% of the time. To minimize this occurrence, toll base station range 220 is generally the minimum required area for mobile station 240 to camp to it and transmit an identity signal so that during the re-selection process mobile station 240 will camp to base station 205 and does not re-camp to toll base station 215.

In situations where mobile station 240 is in a dedicated mode, such as when subscriber 245 is talking on the mobile telephone, a connection between mobile station 240 and toll base station 215 may be established by listening to measure reports of the dedicated mobile station 240, decoding them, and storing the Temporary Mobile Subscriber Identifier (TMSI) in a temporary buffer. If mobile station 240 connects later on to a second toll base station in the toll network, it may send the same TMSI together with the location update. Then the toll system would then determine whether or not to assess a toll based on the time and the distance between the two registrations.

In some situations if mobile station 240 is in dedicated mode and passes into toll base station range 220, the systems and methods of the invention also select a toll BSIC (Base Station Identity Code) and toll BSIC frequency so that they do not disrupt an ongoing call due to handover failure.

In a typical embodiment, the Location Update Rejected procedure involving "retry upon entry into a new cell" is the best possible reject cause. When this cause is used mobile station 240 performs a Location Update Procedure when a new Location Area is entered, or, for example after 4 failed Location Update attempts when a new cell (i.e., base station range 210 or toll base station range 220) is entered.

The systems and methods of the present invention are sufficiently robust to handle embodiments where base station 205 authenticates itself to mobile station 240 as being part of a GSM or other network. In this embodiment toll base station 215 requests identifying information from mobile station 240 before and authentication or encryption procedure takes place. In this way, toll base station 215 may still receive the desired identifying information.

The systems and methods of the present invention provide access the IMEI number of a mobile station 240 without substantial interference to standard mobile services. Generally, by adapting and optimizing IMSI catchers to create IMEI catchers the systems and methods disclosed herein allow for automated wireless toll collection based on GSM network compatible technology. In a preferred embodiment, mobile subscriber 240 is in idle (standby) mode. However, other operational modes are possible. By increasing the amount of required measurement equipment the number of missed registrations of dedicated mobile stations 240 is minimized.

Generally, both method 100 and system 200 may include situations where a vehicle is passing along a road where a fee must be paid for each passage along that road. Method 100 and system 200 also cover embodiments where a fee is charged to a vehicle for entrance into (or exit from) any geographic area, such as a parking lot or parking garage. Furthermore, these systems and methods do not require the presence of a vehicle and may include situations where a person is entering a geographic area where either a fee is required or where access is restricted to authorized persons. Examples of areas where a fee is charged to a person include entrance into stadiums, arenas, theaters and the like. Examples of areas where entry is restricted to authorized personal include military bases, office buildings and the like. In cases where entry is restricted to authorized personal but no toll is due, the subscriber (i.e., person) may be authenticated and then allowed to enter the geographic area without levying a toll against the person.

In FIGS. 1 through 3, the enumerated items are shown as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the systems and methods provided by the invention afford a simple and effective automated wireless toll collection. The systems and methods according to embodiments of the invention are able to use existing mobile telephones and associated networks, and do not require a dedicated transponder. This increases efficiency and compatibility, and lowers cost.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than the foregoing description, and all changes that come within the meaning and range of equivalency of the claims are therefore intended to be embraced therein.

The disclosures in PCT Application No. PCT/EP2006/067087 from which this application claims priority are incorporated herein by reference.

What is claimed is:

1. A method for automatic electronic authorization for entry into a geographic area based on detection of a mobile telephone operable on a mobile telephone network, comprising:

providing a toll base station that mimics the signal of a base station of the mobile telephone network but that does not form part of any mobile telephone network by being dedicated to retrieving information for automated toll collection and not for mobile telephone communications and does not connect outgoing or uplink calls;

transmitting, by a transmitter associated with the toll base station, a signal indicating the presence of the toll base station;

detecting, by a receiver associated with the toll base station, a request by a mobile telephone to connect to the toll base station;

transmitting, by the transmitter, an identity request signal to the mobile telephone;

detecting an identity response signal that identifies the mobile telephone;

determining the identity of a subscriber associated with the mobile telephone based on the detected identity response signal and authorizing the subscriber to enter the geographic area based on the determined subscriber identity.

2. The method of claim 1, further comprising:

extracting billing parameters associated with the subscriber; and processing the identity response signal to invoice the subscriber a monetary amount of a toll due for entry into the geographic area, based on the identity response signal associated with the mobile subscriber.

3. The method of claim 1, further comprising connecting the mobile telephone to the toll base station.

4. The method of claim 3, further comprising releasing the connection between the mobile telephone and the toll base station, the mobile telephone then connecting to a base station associated with the mobile telephone network.

5. The method of claim 1, wherein transmitting the signal indicating the presence of the toll base station comprises transmitting a Location Area Identity signal including a first location area code that is different from a location area code of the geographically nearest base station associated with the mobile telephone network.

6. The method of claim 1, wherein detecting the request to connect to the toll base station comprises receiving a Radio Resource connection including a Radio Resource Channel request signal in an access burst on a Random Access Channel associated with the toll base station.

7. The method of claim 1, wherein detecting the request to connect to the toll base station comprises receiving a Location Update Request signal on a Stand-alone Dedicated Control Channel.

8. The method of claim 1, wherein transmitting an identity request signal to the mobile telephone comprises transmitting an International Mobile Equipment Identity request signal.

9. The method of claim 1, wherein detecting the identity response signal comprises detecting an International Mobile Equipment Identity signal associated with the mobile subscriber.

10. The method of claim 1, wherein determining the identity of the subscriber comprises: comparing the extracted characteristics of the subscriber with a database containing data associated with a plurality of subscribers of an automatic toll payment service; and verifying that a detected identity response signal is associated with one of the plurality of subscribers.

11. The method of claim 2, wherein extracting the billing parameters comprises extracting at least one of a subscriber name, a subscriber address, and a subscriber account.

12. A system for automatic electronic authorization for entry into a geographic area based on detection of a mobile telephone operable on a mobile telephone network, comprising:

providing a toll base station that mimics the signal of a base station of the mobile telephone network but that does not form part of any mobile telephone network by being dedicated to retrieving information for automated toll collection and not for mobile telephone communications and does not connect outgoing or uplink calls;

a transmitter associated with the toll base station, the transmitter transmitting a signal indicating the presence of the toll base station;

a receiver associated with the toll base station, the receiver detecting a request by a mobile telephone to connect to the toll base station;

the transmitter transmitting an identity request signal to the mobile telephone;

the receiver detecting an identity response signal that identifies the mobile telephone;

a processor determining the identity of a subscriber associated with the mobile telephone based on the detected identity response signal; and the processor authorizing the subscriber to enter the geographic area based on the determined subscriber identity.

13. The system of claim 12, further comprising:

the processor extracting billing parameters associated with the subscriber; and the processor processing the identity response signal to invoice the subscriber a monetary amount of a toll due for passage along a road, based on the identity response signal associated with the mobile subscriber.

14. The system of claim 12, wherein, after the receiver detects the identity response signal, the mobile telephone connects to the toll base station.

15. The system of claim 14, wherein the connection between the mobile telephone and the toll base station is released and the mobile telephone then connects to a base station associated with the mobile telephone network.

16. The system of claim 12, wherein the signal indicating the presence of the toll base station comprises a Location Area Identity signal including a first location area code that is different from a location area code of the geographically nearest base station associated with the mobile telephone network.

17. The system of claim 12, wherein the request to connect to the toll base station comprises a Radio Resource connection including a Radio Resource Channel request signal in an access burst on a Random Access Channel associated with the toll base station.

18. The system of claim 12, wherein the request to connect to the toll base station comprises a Location Update Request signal on a Stand-alone Dedicated Control Channel.

19. The system of claim 12, wherein the identity request signal to the mobile telephone comprises an International Mobile Equipment Identity request signal.

20. The system of claim 12, wherein the identity response signal comprises an International Mobile Equipment Identity signal associated with the mobile telephone.

21. The system of claim 13, further comprising:
- the processor comparing the extracted billing parameters of the subscriber with a database containing data associated with a plurality of subscribers of an automatic toll payment service; and
- the processor verifying that a detected identity response signal is associated with one of the plurality of subscribers.

22. A system for automatic electronic authorization for entry into a geographic area based on detection of a mobile telephone operable on a mobile telephone network, comprising:
- providing a toll base station that mimics the signal of a base station of the mobile telephone network but that does not form part of any mobile telephone network by being dedicated to retrieving information for automated toll collection and not for mobile telephone communications and does not connect outgoing or uplink calls;
- means for transmitting a signal from the toll base station indicating the presence of the toll base station;
- means for detecting a request by a mobile telephone to connect to the toll base station;
- means for transmitting an identity request signal to the mobile telephone;
- means for detecting an identity response signal that identifies the mobile telephone;
- means for determining the identity of a subscriber associated with the mobile telephone based on the detected identity response signal; and
- means for authorizing the subscriber to enter the geographic area based on the determined subscriber identity.

23. The system of claim 12, further comprising:
- means for extracting billing parameters associated with the subscriber; and
- means for processing the identity response signal to invoice the subscriber a monetary amount of a toll due for passage along a road, based on the identity response signal associated with the mobile subscriber.

24. An article of manufacture comprising a program storage medium having computer readable program executable code embodied therein for automatic electronic toll payment based on detection of a mobile telephone operable on a mobile telephone network, the computer readable program executable code in the article of manufacture comprising:
- computer readable executable code for causing a computer to transmit a signal from a toll base station which mimics the signal of base stations of the mobile telephone network but does not form part of the mobile communication network by being dedicated to retrieving information for automated toll collection and not for mobile telephone communications and does not connect outgoing or unlink calls, indicating the presence of the toll base station;
- computer readable executable code for causing a computer to detect a request by a mobile telephone to connect to the toll base station; computer readable code for causing a computer to transmit an identity request signal to the mobile telephone;
- computer readable executable code for causing a computer to detect an identity response signal that identifies the mobile telephone;
- computer readable executable code for causing a computer to determine the identity of a subscriber associated with the mobile telephone based on the detected identity response signal; and computer readable executable code for causing a computer to authorizing the subscriber to enter the geographic area based on the determined subscriber identity.

25. The article of manufacture of claim 24, further comprising:
- computer readable code for causing a computer to extract billing parameters associated with the subscriber; and
- computer readable executable code for causing a computer to process the identity response signal to invoice the subscriber a monetary amount of a toll due for passage along a road, based on the identity response signal associated with the mobile subscriber.

* * * * *